United States Patent
Nam et al.

(10) Patent No.: US 10,114,158 B2
(45) Date of Patent: Oct. 30, 2018

(54) STRETCHED LAMINATE, METHOD OF MANUFACTURING THIN POLARIZER, THIN POLARIZER MANUFACTURED BY THE METHOD, AND POLARIZING PLATE INCLUDING THE THIN POLARIZER

(71) Applicant: LG Chem, Ltd., Seoul (KR)

(72) Inventors: Sung Hyun Nam, Daejeon (KR); Jong-Hyun Jung, Daejeon (KR); Kyun-Il Rah, Daejeon (KR); Hye-Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1032 days.

(21) Appl. No.: 14/386,247

(22) PCT Filed: Jun. 16, 2014

(86) PCT No.: PCT/KR2014/005248
§ 371 (c)(1),
(2) Date: Sep. 18, 2014

(87) PCT Pub. No.: WO2014/204150
PCT Pub. Date: Dec. 24, 2014

(65) Prior Publication Data
US 2016/0084990 A1     Mar. 24, 2016

(30) Foreign Application Priority Data

Jun. 18, 2013 (KR) .................. 10-2013-0069833
Jun. 12, 2014 (KR) .................. 10-2014-0071687

(51) Int. Cl.
*G02B 1/08* (2006.01)
*G02B 5/30* (2006.01)
*B29D 11/00* (2006.01)

(52) U.S. Cl.
CPC ........ *G02B 5/3033* (2013.01); *B29D 11/0073* (2013.01); *B29D 11/00644* (2013.01)

(58) Field of Classification Search
CPC .......... B29D 11/0073; B29D 11/00644; G02B 5/3033
See application file for complete search history.

(56) References Cited

U.S. PATENT DOCUMENTS 6,312,772 B1 * 11/2001 Kuder .................. B32B 27/36
                                                         428/1.5
2010/0202051 A1 * 8/2010 Yoshimi .................. G02B 1/04
                                                         359/489.2

(Continued)

FOREIGN PATENT DOCUMENTS

CN       101809472 A      8/2010
EP         0121318 A1     10/1984

(Continued)

OTHER PUBLICATIONS

Human translation of JP 2000338329, Publication Dec. 8, 2000, Osamu Okamoto.*

(Continued)

*Primary Examiner* — Vishal I Patel
(74) *Attorney, Agent, or Firm* — Dentons US LLP

(57) ABSTRACT

There is provided a stretched laminate formed by stretching a laminate including: a non-stretched high-density polyethylene film; and a non-stretched polyvinyl alcohol-based film attached to at least one surface of the high-density polyethylene film, wherein the polyvinyl alcohol-based film has a thickness of 10 μm or less after stretching. In addition, there are provided a method of manufacturing a thin polarizer using the stretched laminate, a thin polarizer manufacturing by the method, and a polarizing plate including the thin polarizer.

9 Claims, 2 Drawing Sheets

(56) References Cited

U.S. PATENT DOCUMENTS

2012/0058291 A1   3/2012   Kitagawa et al.
2012/0327512 A1   12/2012  Goto et al.

FOREIGN PATENT DOCUMENTS

| EP | 121318 B1 * | 11/1987 |
| JP | 62-089002 A | 4/1987 |
| JP | 2000338329 A | 12/2000 |
| JP | 2001343521 A | 12/2001 |
| JP | 2009-093074 A | 4/2009 |
| JP | 2011-128486 A | 6/2011 |
| JP | 2011-227450 A | 11/2011 |
| JP | 2012-093663 A | 5/2012 |
| JP | 2012-103466 A | 5/2012 |
| JP | 2012-145766 A | 8/2012 |
| KR | 19920001279 B1 | 2/1992 |
| TW | 200923446 A | 6/2009 |
| TW | 201311429 A1 | 3/2013 |
| WO | 2010/100917 A1 | 9/2010 |
| WO | 2012-105668 A1 | 8/2012 |

OTHER PUBLICATIONS

Anonymous: "High-density Polyethylene", Wikipedia, the free encyclopedia May 18, 2013 (May 18, 2013), XP002750646, Retrieved from the Internet: URL:https://web.archive.org/web/20130518131243/http://en.wikipedia.org/wiki/High-density_polyethylene [retrieved on Nov. 9, 2015] * the whole document *.

Anonymous: "high-density polyethylene", Dictionary.com Nov. 2, 2015 (Nov. 2, 2015), XP002750647, Retrieved from the Internet: URL:http://dictionary.reference.com/browse /high-density-polyethylene [retrieved on Nov. 2, 2015] * the whole document *.

* cited by examiner

[Figure 1]
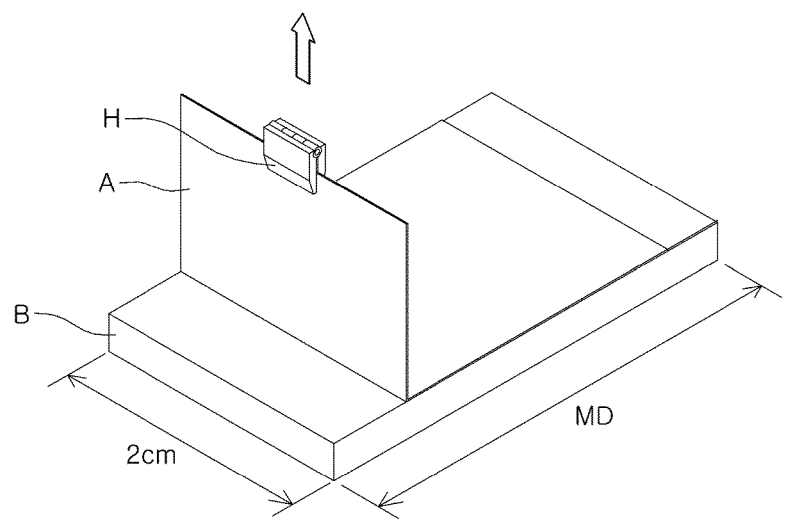
[Figure 2]

【Figure 3】
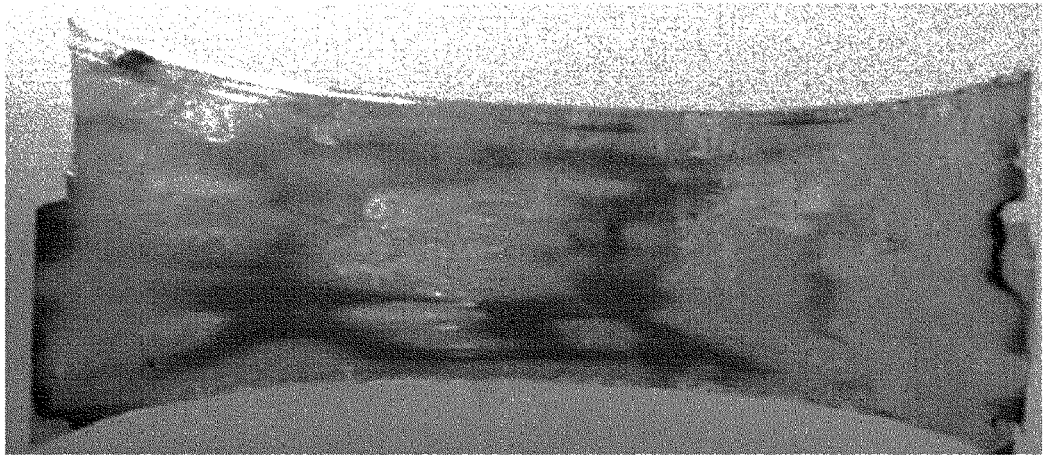

STRETCHED LAMINATE, METHOD OF MANUFACTURING THIN POLARIZER, THIN POLARIZER MANUFACTURED BY THE METHOD, AND POLARIZING PLATE INCLUDING THE THIN POLARIZER

This application is a National Stage Entry of International Application No. PCT/KR2014/005248, filed Jun. 16, 2014, and claims the benefit of Korean Application No. 10-2013-0069833 filed on Jun. 18, 2013, and Korean Application No. 10-2014-0071687, filed Jun. 12, 2014, all of which are hereby incorporated by reference in their entirety for all purposes as if fully set forth herein.

TECHNICAL FIELD

The present disclosure relates to a stretched laminate, a method of manufacturing a thin polarizer, a thin polarizer manufactured by the method, and a polarizing plate including the thin polarizer.

BACKGROUND ART

Polarizers included in polarizing plates are optical devices for polarizing natural light or arbitrarily polarized light in a particular direction, and are widely used in display devices such as liquid crystal displays (LCDs) or organic light emitting diode (OLED) displays. Currently, polyvinyl alcohol-based polarizing films, containing an iodine-based compound or a dichroic dye and having a molecular structure in which molecular chains are oriented in a particular direction, are generally used as polarizers of display devices.

Polyvinyl alcohol-based polarizing films are manufactured by dyeing a polyvinyl alcohol-based film with iodine or a dichroic dye, stretching the polyvinyl alcohol-based film in a particular direction, and performing a cross-linking process thereon. In this case, the stretching process may be a wet stretching process using a solution such as an aqueous boric acid solution or an aqueous iodine solution or a dry stretching process performed in the atmosphere, and the stretching ratio of the stretching process is generally 5 times or greater. In such a manufacturing process, the thickness of a polyvinyl alcohol-based film may be 60 μm or greater before stretching so as to prevent breakage during stretching. If the thickness of the polyvinyl alcohol-based film is less than 60 μm before stretching, the degree of swelling of the polyvinyl alcohol-based film may increase, and the polyvinyl alcohol-based film may easily be broken during stretching because the modulus of electricity of the polyvinyl alcohol-based film per unit area is high due to a thin thickness.

Recently, polarizing plates have been required to have reduced thicknesses to allow for the use thereof with thinner display devices. However, if polyvinyl alcohol-based films having a thickness greater than 60 μm are used as described above, there is a limit to reducing the thickness of polarizers. Thus, much research has recently been conducted into developing thinner polarizers. For example, according to a recently proposed method for manufacturing a thin polarizer, a resin layer is formed on a base film by coating the base film with a polyvinyl alcohol-based resin and drying the polyvinyl alcohol-based resin, and then a stretching process is performed. In the method, a crystalline ester-based resin or an amorphous ester-based resin is used as the base film. Specifically, a crystalline ester-based resin such as a crystalline polyethylene terephthalate resin, or an amorphous ester-based resin such as an amorphous polyethylene terephthalate resin is used as the base film.

However, if a crystalline polyethylene terephthalate resin is used, the ratio of stretching is limited to 5 times, and if an amorphous polyethylene terephthalate resin is used, the ratio of stretching is limited to 5.5 times. Therefore, a high-ratio stretching process may not be performed, and thus there is a limit to improving optical characteristics. In addition, if a polyethylene terephthalate resin is used as described above, since the degree of crystallization of the polyethylene terephthalate resin is high and a high tensile force is required because of the structure and characteristics of the polyethylene terephthalate resin and the conditions of a stretching process performed after a melting-solution casting process, a dry stretching process may be performed only at a high temperature of about 120° C. to about 170° C. Therefore, to perform a dry stretching process at a high temperature of about 120° C. to about 170° C., an additional heating process may be required, or process costs may be increased. Furthermore, since a polyvinyl alcohol film formed on a base film has a glass transition temperature of about 70° C. to about 80° C., the polyvinyl alcohol film may be damaged or properties thereof may be changed during a high-temperature dry stretching process. In addition, if a polyethylene terephthalate resin is used as described above, since a base film formed of the polyethylene terephthalate resin is difficult to stretch, cross-linking of polyvinyl alcohol by a boric acid may be increased during a wet stretching process using an aqueous boric acid solution, and in this case, the ratio of stretching may be decreased. In addition, if a polyethylene terephthalate resin is used as described above, since a base film formed of the polyethylene terephthalate resin is difficult to stretch, cross-linking of polyvinyl alcohol by a boric acid may be increased during a wet stretching process using an aqueous boric acid solution, and in this case, the ratio of stretching may be reduced.

In addition, if the above-described coating method or a co-extrusion method is used, it may be difficult to separate a polyvinyl alcohol layer and a base layer from each other after stretching, and since a large amount of peel force is used for separating the layers, the polyvinyl alcohol layer may easily be damaged or deformed during separation. As a result, optical characteristics of a polyvinyl alcohol-based film such as a degree of polarization may deteriorate. Furthermore, if a coating method or a co-extrusion method is used, since a polyvinyl alcohol resin is melted and extruded or is made into a coating solution and applied, the physical properties of a polyvinyl alcohol film may be easily varied according to extrusion conditions, coating conditions, or film-forming conditions. Therefore, the physical properties of final polyvinyl alcohol products may deteriorate, and it may be difficult to obtain final polyvinyl alcohol products having uniform physical properties.

DISCLOSURE

Technical Problem

An aspect of the present disclosure may include a stretched laminate that is processable using either of a low-temperature dry stretching process and a wet stretching process using an aqueous boric acid solution, stretchable with a high stretching ratio, and easy to peel. Other aspects of the present disclosure may provide a method of manufacturing a thin polarizer having superior optical characteristics and a thickness of 10 μm or less by using the stretched laminate, a thin polarizer manufactured by the method, and a polarizing plate including the thin polarizer.

Technical Solution

According to an aspect of the present disclosure, a stretched laminate may be formed by stretching a laminate including: a non-stretched high-density polyethylene film; and a non-stretched polyvinyl alcohol-based film attached to at least one surface of the high-density polyethylene film, wherein the polyvinyl alcohol-based film may have a thickness of 10 μm or less after stretching.

The high-density polyethylene film may have a specific gravity of 0.93 or greater compared to 4° C. water having a density of 0.999973 g/cm$^3$. For example, the high-density polyethylene film may have a specific gravity of about 0.93 to about 0.98 or about 0.94 to about 0.97, compared to 4° C. water (having a density of 0.99973 g/cm3).

According to another aspect of the present disclosure, a method of manufacturing a thin polarizer may include: forming a laminate by attaching a non-stretched polyvinyl alcohol-based film to at least one surface of a non-stretched high-density polyethylene film; and stretching the laminate until the polyvinyl alcohol-based film has a thickness of 10 μm or less.

The forming of the laminate may include attaching the non-stretched high-density polyethylene film and the non-stretched polyvinyl alcohol-based film to each other by using attractive force therebetween or an adhesive.

The stretching of the laminate may be performed within a temperature range of 20° C. to 80° C. at a stretching ratio of 5 times to 15 times. For example, the stretching of the laminate may be performed in an aqueous boric acid solution having a boric acid concentration of 1 wt % to 5 wt %. Alternatively, the stretching of the laminate may be performed using a dry stretching method within a temperature range of 20° C. to 80° C. with a stretching ratio of 5 times to 15 times.

After the stretching of the laminate, an adhesive force between the stretched polyvinyl alcohol-based film and the stretched high-density polyethylene film may be 2 N/2 cm or less, about 0.1 N/2 cm to about 2 N/2 cm, or about 0.1 N/2 cm to about 1 N/2 cm.

Before the stretching of the laminate, the method may further include dyeing the non-stretched polyvinyl alcohol-based film with one or more of iodine and a dichroic dye. In detail, the method may further include: swelling the non-stretched polyvinyl alcohol-based film; and then dyeing the non-stretched polyvinyl alcohol-based film with iodine and/or a dichroic dye.

After the stretching of the laminate, the method may further include separating the stretched polyvinyl alcohol-based film from the stretched high-density polyethylene film. In this case, the separating of the stretched polyvinyl alcohol-based film from the stretched high-density polyethylene film may be performed by applying a peel force of 2 N/2 cm or less, for example, about 0.1 N/2 cm to about 2 N/2 cm.

According to another aspect of the present disclosure, a thin polarizer may be manufactured by the method and may have a thickness of 10 μm or less, a single transmittance of 40% to 45%, a degree of polarization of 99.0% or greater, and a standard deviation of 0.002% or less calculated from degrees of polarization measured at 10 points located at regular intervals in a width direction of the thin polarizer.

According to another aspect of the present disclosure, a polarizing plate may include the thin polarizer.

Advantageous Effects

According to the present disclosure, a thin polarizer may be manufactured to have features such as processability through both a low-temperature dry stretching process and a wet stretching process using an aqueous boric acid solution, high-ratio stretchability, superior optical characteristics, and a thickness of 10 μm or less.

Furthermore, according to the present disclosure, a high-density polyethylene film and a polyvinyl alcohol-based film may not be separated from each other during a stretching process, and surfaces of the films may be minimally damaged during a separating process after the stretching process. Therefore, the stability of the stretching process may be high.

DESCRIPTION OF DRAWINGS

FIG. 1 is a schematic view illustrating a method of measuring an adhesive force by using a texture analyzer.

FIG. 2 illustrates a polyvinyl alcohol-based film manufactured in Comparative Example 2.

FIG. 3 illustrates a polyvinyl alcohol-based film manufactured in Comparative Example 3.

BEST MODE

Embodiments of the present disclosure will now be described in detail. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

The inventors have repeatedly conducted research into manufacturing a thin polarizer having features such as processability through both a low-temperature dry stretching process and a wet stretching process using an aqueous boric acid solution, high-ratio stretchability, superior optical characteristics, and a thickness of 10 μm or less. As a result, the inventors have found that the objects as described above could be achieved by using a high-density polyethylene film as a base film, disposing a polyvinyl alcohol-based film on the base film, and simultaneously stretching the films. Based on this knowledge, the inventors have invented the present invention.

Hereinafter, the invention invented by the inventors will be described in more detail.

[Stretched Laminate]

A stretched laminate of the present disclosure is formed by stretching a laminate including: a non-stretched high-density polyethylene film; and a non-stretched polyvinyl alcohol-based film attached to at least one surface of the high-density polyethylene film, wherein the polyvinyl alcohol-based film has a thickness of 10 μm or less after stretching.

(High-Density Polyethylene Film)

In the present disclosure, the high-density polyethylene film is included in the laminate to prevent breakage of the polyvinyl alcohol-based film during stretching, and the high-density polyethylene film may have a specific gravity of 0.93 or greater, preferably about 0.93 to about 0.98, more preferably about 0.94 to about 0.97. If the specific gravity of the high-density polyethylene film is within the above-mentioned range, the high-density polyethylene film may have a high degree of crystallization, a high melting point, and a high degree of rigidity, and thus a thin polarizer having superior optical characteristics may be manufactured through a high-ratio stretching by using the high-density polyethylene film. In addition, a thin polarizer manufactured as a final product may be easily separated from the high-density polyethylene film used as a base film. The specific gravity refers to a specific gravity value measured using 4° C. water (having a density of 0.99973 g/cm3) as a reference material.

Before stretching, the thickness of the high-density polyethylene film may range from about 20 µm to about 100 µm, preferably from about 30 µm to about 90 µm. If the high-density polyethylene film is too thin, when a stack of the high-density polyethylene film and the polyvinyl alcohol-based film is stretched, the high-density polyethylene film may not sufficiently support the polyvinyl alcohol-based film to result in problems such as breakages. If the high-density polyethylene film is too thick, the high-density polyethylene film may have a modulus of electricity and a low degree of stretchability and thus may hinder widthwise shrinkage of the polyvinyl alcohol-based film during a drying process. In this case, a polarizer obtained as a final product may have poor optical characteristics.

(Polyvinyl Alcohol-Based Film)

The polyvinyl alcohol-based film attached to at least one surface of the high-density polyethylene film may be used as a thin polyvinyl alcohol-based polarizer after being subjected to processes such as a stretching process and a dyeing process. Any film including a polyvinyl alcohol resin or a derivative thereof may be used as the polyvinyl alcohol-based film without limitations. Non-limiting examples of the derivative of a polyvinyl alcohol resin may include a polyvinyl formal resin and a polyvinyl acetal resin. In addition, any commercially available polyvinyl alcohol-based film used in the related art as a film for the manufacturing of a polarizer, such as M2000, M2001, M2005, M3000, and M6000 by Japan Synthetic Rubber, and P30, PE20, PE30, and PE60 by Kurary, may be used as the polyvinyl alcohol-based film.

Before stretching, the thickness of the polyvinyl alcohol-based film may range from about 60 µm or less, for example, from about 5 µm to about 60 µm, preferably from about 10 µm to about 40 µm. If the polyvinyl alcohol-based film is too thin, when the polyvinyl alcohol-based film forms a layer of a laminate and undergoes a stretching process, the polyvinyl alcohol-based film may easily be broken. On the other hand, if the polyvinyl alcohol-based film is too thick, the thickness of a final polarizer may be increased, and thus it may be difficult to manufacture a thin polarizer having a thickness of 10 µm or less.

After stretching, the polyvinyl alcohol-based film may have a thin thickness of about 10 µm or less, for example, about 1 µm to about 10 µm, preferably about 3 µm to about 8 µm. The polyvinyl alcohol-based film may be attached to one surface of the high-density polyethylene film or both surfaces of the high-density polyethylene film, and may then be stretched to a thickness of 10 µm or less.

The polyvinyl alcohol-based film may have a degree of polymerization within the range of about 1,000 to about 10,000, preferably about 1,500 to about 5,000. However, the polyvinyl alcohol-based film is not limited thereto. If the degree of polymerization of the polyvinyl alcohol-based film is within the above-mentioned range, molecules of the polyvinyl alcohol-based film may freely move and may be smoothly mixed with iodine or a dichroic dye.

In addition, the polyvinyl alcohol-based film may be a film dyed with iodine or a dichroic dye. For example, the polyvinyl alcohol-based film may be a film treated by a swelling process and a dyeing process.

[Method of Manufacturing Thin Polarizer]

Next, according to the present disclosure, a method of manufacturing a thin polarizer using the above-described stretched laminate is provided. The method includes forming a laminate by attaching a non-stretched polyvinyl alcohol-based film to at least one surface of a non-stretched high-density polyethylene film; and stretching the laminate until the polyvinyl alcohol-based film has a thickness of 10 µm or less.

(Formation of Laminate)

In the present disclosure, a method of attaching the polyvinyl alcohol-based film to the high-density polyethylene film is not limited. For example, the laminate may be formed by attaching the high-density polyethylene film and the polyvinyl alcohol-based film to each other using any adhesive known in the related art. For example, the adhesive may be an aqueous adhesive or an ultraviolet (UV)-curable adhesive.

In more detail, the adhesive may be an aqueous adhesive including at least one selected from the group consisting of polyvinyl alcohol-based resins, acrylic resins, and vinyl acetate-based resins.

Alternatively, the adhesive may be an aqueous adhesive including a polyvinyl alcohol-based resin having an acryl group and a hydroxy group. The polyvinyl alcohol-based resin having an acryl group and a hydroxy group may have a degree of polymerization within the range of about 500 to about 1,800.

Alternatively, the adhesive may be an aqueous adhesive that includes a polyvinyl alcohol-based resin having an acetacetyl group, and an amine-based metal compound cross-linking agent. In the case of an adhesive formed by adding an amine-based metal compound cross-linking agent to a polyvinyl alcohol-based resin having an acetacetyl group, when the adhesive is hardened, a cross-linking reaction occurs between the amine-based metal compound cross-linking agent and the acetacetyl group of the polyvinyl alcohol-based resin, and thus the water resistance of the adhesive is markedly improved after hardening. As a result, in a wet stretching process, the amount of the adhesive dissolving in water may be minimized, and thus the adhesive may be usefully used in the wet stretching process.

In more detail, the adhesive of the present disclosure may be an aqueous solution including a polyvinyl alcohol-based resin having an acetacetyl group and an amine-based metal compound cross-linking agent, and the aqueous solution may have a pH of about 4.5 to about 9. If the pH of the adhesive is within the above-mentioned range, the adhesive may have improved storability, and durability in high-humidity environments. The pH of the adhesive may be adjusted by adding an acid such as nitric acid, hydrochloric acid, sulfuric acid, or acetic acid to an aqueous solution.

In the present disclosure, the adhesive may include 100 parts by weight of the polyvinyl alcohol-based resin having an acetacetyl group, and 1 part by weight to 50 parts by weight of the amine-based metal compound cross-linking agent.

The degree of polymerization and degree of saponification of the polyvinyl alcohol-based resin are not limited as long as the polyvinyl alcohol-based resin has an acetacetyl group. However, it may be preferable that the polyvinyl alcohol-based resin has a degree of polymerization within the range of 200 to 4,000 and a degree of saponification within the range of 70 mol % to 99.9 mol %. In terms of free molecular movement and smooth mixing of ingredients, it may be preferable that the polyvinyl alcohol-based resin have a degree of polymerization within the range of 1,500 to 2,500 and a degree of saponification within the range of 90 mol % to 99.9 mol %. In this case, it may be preferable that the polyvinyl alcohol-based resin have an acetacetyl group content within the range of 0.1 mol % to 30 mol %. If the acetacetyl group content is within the above-mentioned range, the polyvinyl alcohol-based resin may smoothly react with the amine-based metal compound cross-linking agent, and the water resistance of the adhesive may be sufficiently high.

The amine-based metal compound cross-linking agent may be a water-soluble cross-linking agent having a functional group reactive with the polyvinyl alcohol-based resin. In this regard, the amine-based metal compound cross-linking agent may be a metal complex having an amine-based ligand. A metal included as a central metal in the metal complex may be a transition metal such as zirconium (Zr), titanium (Ti), hafnium (Hf), tungsten (W), iron (Fe), cobalt (Co), nickel (Ni), ruthenium (Ru), osmium (Os), rhodium (Rh), iridium (Ir), palladium (Pd), or platinum (Pt). Any one having at least one amine group, such as primary amine, secondary amine (diamine), tertiary amine, or ammonium hydroxide, may be bonded as a ligand to the central metal. The content of the amine-based metal compound cross-linking agent may range from 1 part by weight to 50 parts by weight based on 100 parts by weight of the polyvinyl alcohol-based resin. In this case, the adhesive may have sufficient adhesiveness, and the storability (pot life) of the adhesive may be improved.

In the adhesive of the present disclosure, it may be preferable that the polyvinyl alcohol-based resin having an acetacetyl group have a solid content within the range of about 1 wt % to about 10 wt %. If the solid content of the polyvinyl alcohol-based resin is less than 1 wt %, sufficient water resistance may not be obtained, and the possibility of breakage in a stretching process may not be effectively reduced. On the other hand, if the solid content of the polyvinyl alcohol-based resin is greater than 10 wt %, workability may be lowered, and the surface of the polyvinyl alcohol-based film may be damaged when the polyvinyl alcohol-based film is peeled.

Alternatively, the adhesive may be a UV-curable adhesive. For example, the adhesive may be a UV-curable adhesive including a first epoxy compound of which a homopolymer has a glass transition temperature of 120° C. or higher, a second epoxy compound of which a homopolymer has a glass transition temperature of 60° C. or lower, and a cationic photopolymerization initiator. In detail, the UV-curable adhesive may include 100 parts by weight of a first epoxy compound of which a homopolymer has a glass transition temperature of 120° C. or higher, 30 parts by weight to 100 parts by weight of a second epoxy compound of which a homopolymer has a glass transition temperature of 60° C. or lower, and 0.5 parts by weight to 20 parts by weight of a cationic photopolymerization initiator.

Herein, epoxy compounds refers to compounds having at least one epoxy group in molecules, for example, at least two epoxy groups in molecules, and the epoxy compounds may be monomers, polymers, resins, or combinations thereof. In the present disclosure, for example, the epoxy compounds may be resins.

The first epoxy compound may be used without particular limitations if the first epoxy compound is an epoxy compound of which a homopolymer has a glass transition temperature of 120° C. or higher. For example, an alicyclic epoxy compound and/or an aromatic epoxy compound of which a homopolymer has a glass transition temperature of 120° C. or higher may be used as the first epoxy compound according to the present disclosure. Specific examples of the epoxy compound of which a homopolymer has a glass transition temperature of 120° C. or higher may include 3,4-epoxycyclohexylmethyl-3,4'-epoxycyclohexanecarboxylate, vinyl cyclohexene dioxide, dicyclopentadiene dioxide, bis(epoxycyclopentyl) ether, bisphenol A-based epoxy compounds, and bisphenol F-based epoxy compounds. It may be more preferable that that the homopolymer of the first epoxy compound have a glass transition temperature of about 120° C. to about 200° C.

Next, the second epoxy compound may be used without particular limitations if the second epoxy compound is an epoxy compound of which a homopolymer has a glass transition temperature of 60° C. or lower. Examples of the second epoxy compound may include alicyclic epoxy compounds and aliphatic epoxy compounds. The alicyclic epoxy compounds may be bifunctional epoxy compounds, i.e., compounds having two epoxy groups. For example, the alicyclic epoxy compounds may be compounds in which two epoxy groups are all alicyclic epoxy groups. However, the alicyclic epoxy compounds are not limited thereto. The aliphatic epoxy compounds may be epoxy compounds that do not have alicyclic epoxy groups but have aliphatic epoxy groups. Examples of the aliphatic epoxy compounds may include: a polyglycidyl ether of an aliphatic polyalcohol; a polyglycidyl ether of an aliphatic polyalcohol-alkylene oxide adduct; a polyglycidyl ether of a polyester polyol of aliphatic polyalcohol and aliphatic polycarboxylic acid; a polyglycidyl ether of an aliphatic polycarboxylic acid; a polyglycidyl ether of a polyester polycarboxylic acid of aliphatic polyalcohol and aliphatic polycarboxylic acid; dimmers, oligomers or polymers obtained by vinyl polymerization of glycidyl acrylate or glycidyl methacrylate; and oligomers or polymers obtained by vinyl polymerization of glycidyl acrylate or glycidyl methacrylate and other vinyl-based monomers. For example, the aliphatic epoxy compounds may be polyglycidyl ethers of aliphatic polyalcohols or aliphatic polyalcohol-alkylene oxide adducts. However, the aliphatic epoxy compounds are not limited thereto.

The second epoxy compound of the present disclosure may include at least one glycidyl ether group. For example, the second epoxy compound of the present disclosure may include at least one selected from the group consisting of 1,4-cyclohexanedimethanoldiglycidyl ether, 1,4-butanedioldiglycidyl ether, 1,6-hexanedioldiglycidyl ether, neopentyldiglycidyl ether, resorcinol diglycidyl ether, diethylene glycol diglycidyl ether, ethylene glycol diglycidyl ether, trimethylolpropane triglycidyl ether, n-butyl glycidyl ether, 2-ethylhexyl glycidyl ether, phenyl glycidyl ether, and o-cresyl glycidyl ether.

It may be more preferable that that the homopolymer of the second epoxy compound have a glass transition temperature of about 0° C. to about 60° C.

In a non-limiting example of the present disclosure, the epoxy compounds may include a combination of a first epoxy compound having at least one epoxidized alicyclic group and a second epoxy compound having at least one glycidyl ether group. Preferably, the weight ratio of the first epoxy compound and the second epoxy compound may be about 1:1 to about 3:1, more preferably 1:1 to 2:1, most preferably 1:1.

When the high-density polyethylene film and the polyvinyl alcohol-based film are attached to each other by using the above-described adhesive and are not yet stretched, the thickness of an adhesive layer may range from about 20 nm to about 4,000 nm, preferably from about 20 nm to about 1,000 nm, more preferably from about 20 nm to about 500 nm. After the laminate is stretched, the thickness of the adhesive layer may range from about 10 nm to about 1,000 nm, preferably from about 10 nm to about 500 nm, more preferably from about 10 nm to about 200 nm. If the thickness of the adhesive layer is within the above-mentioned ranges before and after stretching, the polyvinyl alcohol-based film may be peeled without damage after stretching and drying processes.

In the present disclosure, alternatively, the laminate may be formed by attaching the high-density polyethylene film and the polyvinyl alcohol-based film to each other by attractive force between the high-density polyethylene film and the polyvinyl alcohol-based film without using any intermediate material. As described above, if the high-density polyethylene film and the polyvinyl alcohol-based film are attached to each other by attractive force therebetween without using any intermediate material, the high-density polyethylene film and the polyvinyl alcohol-based film may easily be separated after being stretched. That is, owing to a low peel force, the polyvinyl alcohol-based film may not be damaged during separation, and thus optical characteristics such as the degree of polarization of the polyvinyl alcohol-based film may not deteriorate.

In addition, if the high-density polyethylene film and the polyvinyl alcohol-based film are attached to each other by attractive force therebetween without using any intermediate material, a thin polarizer having uniform properties may be manufactured, and a stretching process may be stably performed without errors such as breakage of films.

In the case in which the high-density polyethylene film and the polyvinyl alcohol-based film are attached to each other by attractive force therebetween as described above, one or both sides of the high-density polyethylene film or the polyvinyl alcohol-based film may be surface-treated before an attachment process so as to improve attractive force between the high-density polyethylene film and the polyvinyl alcohol-based film. In this case, the surface treatment may be performed using a method well known in the related art such as a corona treatment method, a plasma treatment method, or a surface modification treatment method using an aqueous solution of a strong base such as NaOH or KOH.

(Stretching of Laminate)

After forming the laminate by attaching the polyvinyl alcohol-based film to the high-density polyethylene film, the laminate is stretched. At this time, it may be preferable that the laminate be stretched until the thickness of the polyvinyl alcohol-based film has a thickness of 10 μm or less, for example, about 1 μm to about 10 μm or about 3 μm to about 8 μm.

In the present disclosure, a method for stretching the laminate is not limited. For example, the laminate may be uniaxially stretched in a longitudinal direction (machine direction MD) or a transverse direction TD. In addition, the laminate may be stretched in the transverse direction TD while simultaneously inducing shrinkage of the laminate in the machine direction MD. Examples of a method of stretching the laminate in the transverse direction TD may include a fixed end uniaxial stretching method in which an end of the laminate is fixed to a tenter. Examples of a method of stretching the laminate in the machine direction MD may include an inter-roll stretching method, an extrusion-stretching method, and a free-end uniaxial stretching method. In addition, the laminate may be stretched in multiple steps or may be stretched by a biaxial method or an inclined stretching method.

The stretching process may be performed using a wet stretching method. In this case, the adhesive force between surfaces of the base film (high-density polyethylene film) and the polyvinyl alcohol-based film is relatively great as compared to the case of using a dry stretching method, and thus the stretching process may be stably performed. The wet stretching method may be performed using an aqueous boric acid solution, and in this case it may be preferable that the aqueous boric acid solution have a boric acid content within the range of about 1.0 wt % to about 5.0 wt %. If the stretching process is performed using an aqueous boric acid solution as described above, the possibility of breakage of the polyvinyl alcohol (PVA)-based film may be reduced owing to the cross-linking of a boric acid, and the stretching process may be stably performed. In addition, curling of the polyvinyl alcohol-based film that easily occurs in a wet process may be suppressed.

In general, polarizing devices are manufactured through processes such as water-washing, swelling, dyeing, washing, stretching, complementary coloring, and drying. In the present disclosure, the washing process and the stretching process may be performed using an aqueous boric acid solution. The washing process may preferably be performed using an aqueous boric acid solution having a boric acid content of about 0.1 wt % to about 2.5 wt %, more preferably about 0.5 wt % to about 2.0 wt %. The stretching process may preferably be performed using an aqueous boric acid solution having a boric acid content of about 1.0 wt % to about 5.0 wt %, more preferably about 1.5 wt % to about 4.5 wt %.

The stretching process may be performed using a wet stretching method at a temperature of 20° C. to 80° C. with a stretching ratio of 5 times to 15 times, preferably at a temperature of 40° C. to 60° C. or 45° C. to 55° C. with a stretching ratio of 5 times to 12 times or 6 times to 9 times. Existing polyethylene terephthalate films used for general purposes are difficult to stretch because of the structure and properties thereof, and thus a high-ratio stretching process may not be performed on such polyethylene terephthalate films. In addition, if a laminate formed by attaching a polyvinyl alcohol-based film to a polyethylene terephthalate film is stretched by a wet stretching method using a general aqueous boric acid solution, the degree of cross-linking of the polyvinyl alcohol-based film is increased by a boric acid, and thus it may be difficult to increase a stretching ratio. According to the present disclosure, however, since the high-density polyethylene film is used, a stretching process may be performed at a high stretching ratio of 5 times or more as described above.

The stretching process may be performed together with one or more of a dyeing process in which the polyvinyl alcohol-based film is dyed with iodine and/or a dichroic dye and a cross-linking process in which the polyvinyl alcohol-based film is cross-linked with the iodine and/or the dichroic dye after the dyeing process.

In the present disclosure, the high-density polyethylene film is used as a base film. In this case, a dry stretching process may be performed at a low temperature, and thus the use of an additional heating machine may be reduced. Therefore, energy necessary for performing processes may be reduced, and thus manufacturing costs may be reduced.

Specifically, in a method of manufacturing a thin polarizer in the related art, a base film such as a crystalline polyethylene terephthalate film or an amorphous polyethylene terephthalate film is used in a stretching process. In this case, however, it is difficult to perform a stretching process at a high stretching ratio. In addition, after stretching, it is difficult to peel a polyvinyl alcohol-base resin off a base film, and thus a polarizer may be broken when being peeled off. Furthermore, due to the structure of polyethylene terephthalate and process conditions for polyethylene terephthalate, polyethylene terephthalate has a high degree of crystallization and a high degree of tensile strength. Therefore, it is difficult to stretch polyethylene terephthalate at a low temperature, and thus a dry stretching method may be used only at a high temperature ranging from about 120° C. to about 170° C.

Therefore, if a crystalline polyethylene terephthalate film or an amorphous polyethylene terephthalate film is used as a base film, a heating machine may be additionally required for forming a high-temperature process condition, and a large amount of unnecessary energy may be consumed by such a heating machine. Such an additional heating machine and energy consumption for heating may increase manufacturing costs of a thin polarizer. Furthermore, additional efforts may be necessary for controlling the heating machine, and processes may become complex. Particularly, a high stretching ratio may not be obtained if a polyethylene terephthalate film is used as a base film.

In the present disclosure, however, the high-density polyethylene film is used as a base film. Therefore, it is possible to perform a dry stretching process at a low temperature of about 20° C. to about 80° C., preferably 50° C. to 80° C. Therefore, stretching may be simply performed with a smaller amount of energy as compared with the case of the related art, and thus manufacturing costs may be reduced.

Furthermore, in the present disclosure, since the high-density polyethylene film is used as a base film, a high-ratio stretching process may easily be performed as described above to manufacture a thin polarizer having a thickness of 10 μm or less.

In more detail, if a crystalline polyethylene terephthalate film or an amorphous polyethylene terephthalate film is used as a base film like in the related art, a stretching ratio of about 5 times to 5.5 times may only be obtained. However, if a high-density polyethylene film is used, a stretching ratio of abut 5 times to 15 times, for example, 5 times to 12 times or 6 times to 9 times, may be obtained. That is, according to the present disclosure, since high-ratio stretching is possible, a polarizer having a higher degree of polarization as compared with a polarizer of the related may be manufactured.

After the laminate is stretched in the stretching process of the method of manufacturing a polarizer, the adhesive force between the polyvinyl alcohol-based film and the high-density polyethylene film may be 2 N/2 cm or less, preferably about 0.1 N/2 cm to about 2 N/2 cm, more preferably about 0.1 N/2 cm to about 1 N/2 cm. If the adhesive force is within the above-mentioned range, surface damage may be minimized in a later separating process after the stretching process. In the method of manufacturing a thin polarizer of the present disclosure, if an adhesive layer is formed between the polyvinyl alcohol-based film and the high-density polyethylene film, the adhesive layer may also be stretched in the stretching process, and thus the thickness of the adhesive layer may be reduced to about 10% to about 50% of the original thickness. As a result, the adhesive force between the polyvinyl alcohol-based film and the high-density polyethylene film may be reduced to 2 N/2 Cm or less, and thus the polyvinyl alcohol-based film and the high-density polyethylene film may easily be separated from each other.

Herein, the adhesive force refers to a value measured from 2-cm wide sample films. In detail, as shown in FIG. 1, after a polyvinyl alcohol-based film A of a laminate was fixed to a holder H, an adhesive force was measured while peeling the polyvinyl alcohol-based film A off a high-density polyethylene film B by applying a force in a direction perpendicular to the surface of the laminate. At this time, a texture analyzer (Model Name: TA-XT Plus) by Stable Micro Systems was used as a measuring tool.

(Other Processes)

The method of manufacturing a thin polarizer of the present disclosure may further include a process of dyeing the polyvinyl alcohol-based film with iodine and/or a dichroic dye before the stretching process. For example, before the stretching process, the polyvinyl alcohol-based film may be subjected to a swelling process and then a dyeing process in which the polyvinyl alcohol-based film is dyed with iodine and/or a dichroic dye.

In this case, the swelling process may be performed to facilitate adsorption and diffusion of the iodine and/or the dichroic dye in the non-stretched polyvinyl alcohol-based film and improve the stretchability of the non-stretched polyvinyl alcohol-based film. For example, in the swelling process, the non-stretched polyvinyl alcohol-based film or the non-stretched laminate may be immersed in pure water having a temperature of 25° C. to 30° C. for 5 second to 30 seconds, preferably 10 seconds to 20 seconds. However, the swelling process is not limited thereto. The swelling process may be performed until the non-stretched polyvinyl alcohol-based film has a degree of swelling within the range of about 36% to about 44%, preferably about 38% to about 42%. If the non-stretched polyvinyl alcohol-based film has a degree of swelling within the above-mentioned range, optical characteristics of a finally manufactured thin polarizer such as a degree of polarization may be superior. The degree of swelling is calculated by the formula: {(weight of polyvinyl alcohol-based film after swelling−weight of polyvinyl alcohol-based film before swelling)/weight of polyvinyl alcohol-based film before swelling}×100.

The drying process may be performed by putting the non-stretched polyvinyl alcohol-based film or the non-stretched laminate including the non-stretched polyvinyl alcohol-based film into a dyeing bath in which a dyeing solution having iodine and/or a dichroic dye is contained, or applying a dyeing solution having iodine and/or a dichroic dye to the non-stretched polyvinyl alcohol-based film. In this case, water may generally be used as a solvent of the dyeing solution. However, any other solvent compatible with water may also be included in the dyeing solution. The content of the iodine and/or the dichroic dye in the dyeing solution may be within the range of about 0.06 parts by weight to about 0.25 parts by weight based on 100 parts by weight of a solvent. In addition to the iodine and/or the dichroic dye, an adjuvant may be additionally included in the dyeing solution to improve dyeing efficiency. The adjuvant may be an iodide such as potassium iodide, lithium iodide, sodium iodide, zinc iodide, aluminum iodide, lead iodide, copper iodide, barium iodide, calcium iodide, tin iodide, titanium iodide, or a mixture thereof. The content of the adjuvant in the dyeing solution may be within the range of about 0.3 parts by weight to about 2.5 parts by weight based on 100 parts by weight of a solvent. Preferably, the weight ratio of iodine to an iodide may range from about 1:5 to about 1:10. In addition, the drying process may be performed at a temperature of about 25° C. to about 40° C.

for a dyeing bath immersion time period of about 30 seconds to about 120 seconds. However, the drying process is not limited thereto.

In the method of manufacturing a thin polarizer, if necessary, the laminate may be subjected to a drying process after the stretching process. In this case, in terms of optical characteristics of a thin polarizer to be formed, the drying process may be performed at a temperature of about 20° C. to about 100° C., preferably 40° C. to 90° C. for a drying time period of about 1 minute to about minutes. However, the drying process is not limited thereto. The drying process is performed to remove moisture from the surface and inside of polyvinyl alcohol and to thus prevent deterioration of physical characteristics of a polyvinyl alcohol-based polarizer caused by moisture in a polarizing plate manufacturing process. In addition, the drying process induces smooth widthwise shrinkage of the polyvinyl alcohol-based film after the swelling process, thereby increasing the degree of orientation of a polyvinyl alcohol-iodine complex and the degree of polarization of a polarizer.

In the method of manufacturing a thin polarizer, if necessary, a separating process may be performed to separate the polyvinyl alcohol-based film from the high-density polyethylene film after the swelling process. The separating process may be performed to separate the polyvinyl alcohol-based film from the high-density polyethylene film by applying a low peel force to the polyvinyl alcohol-based film. The peel force may preferably be about 2 N/2 cm or less, for example, about 0.1 N/2 cm to about 2 N/2 cm or about 0.1 N/2 cm to about 1 N/2 cm. In the present disclosure, since the peel force is low, the two films may easily be separated without having to use an additional process or machine, and the polyvinyl alcohol-based film may be less damaged in the separating process. Therefore, optical characteristics of the polyvinyl alcohol-based film may be superior.

In the method of manufacturing a thin polarizer of the present disclosure, a process well known in the related art such as a sheet-to-sheet process, a sheet-to-roll process, or a roll-to-roll process may be performed. The sheet-to-sheet process may be performed using sheets of film cut into predetermined sizes as a raw material. The sheet-to-roll process may be performed using a long film wound in a roll as a raw material and sheets of film cut into predetermined sizes as another raw material. The roll-to-roll process may be performed using a roll of film as a raw material. In terms of process continuity and productivity, the roll-to-roll process may be used.

For example, the method of manufacturing a polarizer of the present disclosure may include: a process of forming a laminate by attaching a non-stretched high-density polyethylene film and a non-stretched polyvinyl alcohol-based film to each other while unwinding a roll of the non-stretched high-density polyethylene film and a roll of the non-stretched polyvinyl alcohol-based film; a process of stretching the laminate until the polyvinyl alcohol-based film has a thickness of 10 μm or less; and a process of separating the polyvinyl alcohol-based film from the high-density polyethylene film.

In this case, after the non-stretched high-density polyethylene film and the non-stretched polyvinyl alcohol-based film are attached to each other, the films may be re-wound as a laminate roll and may then be stretched while unwinding the laminate roll, or the films may be directly stretched without re-winding.

In the separating process, the high-density polyethylene film and the polyvinyl alcohol-based film may be separated from each other while inserting a peeling tool such as a peeling roll between surfaces of the films, and then the separated films may be respectively wound around rolls.

[Thin Polarizer and Polarizing Plate]

A thin polarizer manufactured by the above-described method has a thin thickness of about 10 μm or less, preferably about 1 μm to about 10 μm, more preferably about 3 μm to about 8 μm. Although the thin polarizer has a thin thickness, the thin polarizer has a single transmittance within the range of about 40% to about 45%, and a degree of polarization within the range of 99.0% or greater.

The polarizer of the present disclosure manufactured by the above-described method has a high degree of uniformity in widthwise polarization. Specifically, the standard deviation of degrees of polarization measured at 10 points located at regular intervals in a width direction of the polarizer is 0.002% or less.

In the present disclosure, a polarizing plate may be formed by attaching a protective film to one or both surfaces of the polarizer. In this case, the structure of the polarizing plate is not limited as long as the polarizing plate includes the polarizer of the present disclosure. For example, the polarizing plate may have a structure of polarizer/protective film, protective film/polarizer, or protective film/polarizer/protective film.

The protective film supports and protects the polarizer and may be formed of a material generally known in the related art. Non-limiting examples of the protective film may include cellulose based films, polyethylene terephthalate (PET) films, cycloolefin polymer (COP) films, and acrylic films. An acrylic film may be used as the protective film in terms of optical characteristics, durability, and economic factors.

The polarizing plate may be manufactured through a process well known in the related art such as a sheet-to-sheet process, a sheet-to-roll process, or a roll-to-roll process. For example, the roll-to-roll process may be used. A method of manufacturing a polarizing plate by attaching a polarizer and a protective film through a roll-to-roll process is well-known in the related art, and thus a detailed description thereof will not be given. If the polarizing plate is manufactured through a roll-to-roll process, a large roll of the polarizing plate may be obtained.

The polarizing plate may include a retardation film to compensate for an optical phase difference. In the present disclosure, the retardation film is not limited to a particular type. For example, any one of retardation films generally used in the related art may be used according to various liquid crystal modes.

In addition to the retardation film, the polarizing plate may further include any other functional optical layer such as a brightness improving film, a primer layer, a hard coating layer, an anti-glare layer, an anti-reflection layer, or a bonding layer for attachment to a liquid crystal panel. A method of forming such an optical layer is not limited. For example, a method well known in the related art may be used.

The polarizing plate of the present disclosure may be used in various display devices. For example, the polarizing plate may be applied to various display devices such as liquid crystal displays (LCDs) and organic light emitting diode (OLED) displays.

MODE FOR INVENTION

Hereinafter, embodiments of the present disclosure will be described more specifically through examples.

Example 1

A laminate was formed by attaching 30 μm PVA films, PE30 grade by Kuraray, to both sides of a high-density polyethylene film having a thickness of 90 μm and a specific gravity of 0.96 (RF5500AL grade by R&F). A swelling process was performed on the laminate in 25° C. pure water for 15 seconds, and a dyeing process was performed on the laminate in a 0.3 wt %, 25° C. iodine solution for 60 seconds. Thereafter, a washing process was performed on the laminate in a 25° C., 1 wt % boric acid solution for 15 seconds, and a stretching process was performed on the laminate in a 52° C., 2.5 wt % boric acid solution to stretch the laminate with a stretching ratio of 7 times. After the stretching process, a complementary coloring process was performed on the stretched laminate in a 5 wt % potassium iodide (KI) solution, and a drying process was performed in an oven at 80° C. for 5 minutes. After the drying process, the PVA films were peeled off the high-density polyethylene film. In this manner, a thin polarizer having a thickness of 6.8 μm was manufactured.

Example 2

A thin polarizer having a thickness of 6.3 μm was manufactured in the same manner as in Example 1 except that a laminate was formed by attaching PVA-based films to both sides of a high-density polyethylene film having a thickness of 90 μm and a specific gravity of 0.94 (RF5500AL grade by R&F).

Comparative Example 1

A thin polarizer having a thickness of 5.8 μm was manufactured in the same manner as in Example 1 except that a laminate was formed by attaching PVA-based films to both sides of a low-density polyethylene film having a thickness of 75 μm and a specific gravity of 0.91 (RF7500AS grade by R&F).

Comparative Example 2

A thin polarizer was manufactured in the same manner as in Example 1 except that a laminate was formed by attaching PVA-based films to both sides of a polyethylene terephthalate film (NOVA-Clear SG007 grade by MGC), and the laminate was stretched with a stretching ratio of 6 times or greater. However, high-ratio stretching was impossible, and the PVA-based films were damaged as shown in FIG. 2.

Comparative Example 3

A PVA film (M-grade by Japan Synthetic Rubber, average degree of polymerization: 2400, average degree of saponification: 99 mol %) was dissolved in 100° C. pure water to prepare an aqueous PVA solution. Then, a polyethylene terephthalate film (NOVA-Clear SG007 grade by MGC) was coated with the aqueous PVA solution by using a lip coater. Thereafter, the polyethylene terephthalate film was dried in an oven at 80° C. for 10 minutes. In this manner, a film having a PVA coating layer was formed. The thickness of the PVA coating layer was 10 μm. A swelling process was performed on the film in 25° C. pure water for 15 seconds, and a dyeing process was performed on the film in a 0.3 wt %, 25° C. iodine solution for 60 seconds. Thereafter, a washing process was performed on the film in a 25° C., 1 wt % boric acid solution for 15 seconds, and a stretching process was performed on the film in 52° C., 2.5 wt % boric acid solution to stretch the film with a stretching ratio of 5.5 times. After the stretching process, a complementary coloring process was performed in a 5 wt % KI solution, and a drying process was performed in an oven at 80° C. for 5 minutes. However, during the stretching process, the PVA coating layer was peeled off, and thus it was impossible to manufacture a thin PVA film. FIG. 2 shows a film manufactured according to Comparative Example 3.

Comparative Example 4

A PVA film (M-grade by Japan Synthetic Rubber, average degree of polymerization: 2400, average degree of saponification: 99 mol %) was dissolved in 100° C. pure water to prepare an aqueous PVA solution. Then, a polyethylene terephthalate film (NOVA-Clear SG007 grade by MGC) was coated with the aqueous PVA solution by using a lip coater. Thereafter, the polyethylene terephthalate film was dried in an oven at 80° C. for 10 minutes. In this manner, a film having a PVA coating layer was formed. The thickness of the PVA coating layer was 10 μm. A swelling process was performed on the film in a 25° C., 1.0 wt % boric acid aqueous solution for 15 seconds, and a dyeing process was performed on the film in a 25° C. iodine solution having an iodine content of 0.3 wt % and a boric acid content of 3.0 wt % for 60 seconds. Thereafter, a washing process was performed on the film in a 25° C., 1 wt % boric acid solution for 15 seconds, and a stretching process was performed on the film in 60° C., 2.5 wt % boric acid solution to stretch the film with a stretching ratio of 5.5 times. After the stretching process, a complementary coloring process was performed in a 5 wt % KI solution, and a drying process was performed in an oven at 100° C. for 8 minutes. After the drying process, the PVA film was peeled off the polyethylene terephthalate film. In this manner, a thin polarizer having a thickness of 4.5 μm was manufactured.

Experimental Example 1—Comparison of Optical Characteristics

Optical characteristics of the thin polarizers manufactured in the examples and comparative examples were measured with a spectrophotometer (JASCO V-7100) as shown in Table 1 below.

TABLE 1

| NOs. | Base film Kinds | Base film Specific gravity | Single transmittance (%) | Degree of polarization (%) | Single colors a | Single colors b | Perpendicular colors a | Perpendicular colors b |
|---|---|---|---|---|---|---|---|---|
| Example 1 | HDPE | 0.96 | 40.49 | 99.2281 | −0.16 | 1.78 | 1.57 | −1.08 |
| Example 2 | HDPE | 0.94 | 40.71 | 99.0947 | −0.23 | 1.95 | 1.71 | −1.15 |
| Comparative Example 1 | LDPE | 0.91 | 40.17 | 98.9526 | 0.73 | 1.97 | 4.14 | 0.87 |
| Comparative Example 2 | PET | — | 34.97 | 99.4971 | −0.07 | 0.56 | 2.12 | −3.02 |

In table 1, HDPE refers to a high-density polyethylene film, LDPE refers to a low-density polyethylene film, and PET refers to a polyethylene terephthalate film.

In table 1, single transmittance refers to the transmittance of a single polarizer, and the degree of polarization is $[(Tp-Tc)/(Tp+Tc)]^{0.5}$ where Tp refers to parallel transmittance of two polarizers, and Tc refers to perpendicular transmittance of two polarizers.

In addition, single colors a and b refer to colors measured from a single polarizer by using a color-difference meter, and perpendicular colors a and b refer to colors measured from a pair of polarizers disposed with absorption axes thereof being perpendicular to each other by using a color-difference meter. In addition, colors a and b are color values in CIE coordinates. In detail, the color a is calculated by $a=500[(X/Xn)^{1/3}-(Y/Yn)^{1/3}]$, and +a refers to red and −a refers to green. The color b is calculated by $b=200[(Y/Yn)^{1/3}-(Z/Zn)^{1/3}]$, and +b refers to yellow and −b refers to blue. In the above, Xn, Yn, and Zn correspond to X, Y, and Z of a reference color, white.

That is, single colors a and b refer to CIE coordinate values measured from a single polarizer by using a color-difference meter, and perpendicular colors a and b refer to CIE coordinate values measured from a pair of polarizers disposed with absorption axes thereof being perpendicular to each other by using a color-difference meter.

As shown in Table 1 above, Examples 1 and 2 in which a high-density polyethylene film was used resulted in a high degree of polarization as compared with Comparative Example 1 in which a high-density polyethylene film was used.

In Comparative Example 2, it was tried to manufacture a thin polarizer in the same manner as in the examples except for the use of a polyethylene terephthalate film as a base film. However, as shown in FIG. 2, the PVA films were broken during a high-ratio stretching process, and thus a thin polarizer could not be manufactured.

In Comparative Example 3, it was tried to manufacture a thin polarizer in the same manner as in the examples except for the use of a coating method. However, as shown in FIG. 3, the PVA film was partially peeled off a laminate after stretching, and thus a thin polarizer could not be manufactured.

In Comparative Example 4, a boric acid was additionally used in the swelling process and the dyeing process, and the temperature of the stretching process was increased. In that case, although a PVA film could be manufactured by a coating method, the degree of cross-linking of the PVA film was increased due to the boric acid added before the stretching process, and thus the transmittance of a polarizer was lowered. Therefore, a polarizer having transmittance within the range proposed in the present disclosure could not be manufactured.

Experimental Example 2—Comparison of Peel Forces

Peel forces for the thin polarizers manufactured in the examples and comparative examples were measured as shown in Table 2 below. The peel forces (adhesive forces) were measured with a texture analyzer (model name: TA-XT Plus, manufacturer: Stable Micro Systems).

TABLE 2

| NOs. | Base film Kinds | Base film Specific gravity | Peel force (N/2 cm) |
|---|---|---|---|
| Example 1 | HDPE | 0.96 | 0.73 |
| Example 2 | HDPE | 0.94 | 1.05 |
| Comparative Example 1 | LDPE | 0.91 | 9.1 |
| Comparative Example 4 | PET | — | 2.7 |

In table 2, HDPE refers to a high-density polyethylene film, LDPE refers to a low-density polyethylene film, and PET refers to a polyethylene terephthalate film.

As shown in Table 2, when a polarizer was manufactured using a laminate formed by attaching polyvinyl alcohol-based films to both sides of a high-density polyethylene film like in Examples 1 and 2, a peel force of 2 N/2 cm or lower was required. However, when a polarizer was manufactured using a laminate formed by attaching polyvinyl alcohol-based films to both sides of a low-density polyethylene film like in Comparative Example 1, or a laminate formed by coating a polyethylene terephthalate film with polyvinyl alcohol (PVA) like in Comparative Example 4, a peel force greater than 2 N/2 cm was required.

That is, in Examples 1 and 2 in which a laminate was formed by an attaching method using a high-density polyethylene film, a thin polarizer could be easily peeled off. However, in Comparative Examples 1 and 4 in which a laminate was formed using a low-density polyethylene film or a coating method, a polarizer could not be easily peeled off because a high peel force was required, and thus problems such as breakages or deterioration of optical characteristics could arise.

While exemplary embodiments have been shown and described above, it will be apparent to those skilled in the art that modifications and variations could be made without departing from the scope of the present disclosure as defined by the appended claims.

EXPLANATION OF REFERENCE NUMERAL

H: Holder
A: Polyvinyl alcohol-based film
B: Polymer film
MD: Longitudinal stretching direction

The invention claimed is:

1. A method of manufacturing a thin polarizer, the method comprising:
    forming a laminate by attaching a prefabricated non-stretched polyvinyl alcohol-based film to at least one surface of a non-stretched high-density polyethylene film; and
    stretching the laminate until the polyvinyl alcohol-based film has a thickness of 10 µm or less.

2. The method of claim 1, wherein the forming of the laminate comprises attaching the high-density polyethylene film and the prefabricated non-stretched polyvinyl alcohol-based film to each other by using attractive force therebetween or an adhesive.

3. The method of claim 1, wherein the stretching of the laminate is performed within a temperature range of 20° C. to 80° C. at a stretching ratio of 5 times to 15 times.

4. The method of claim 1, wherein the stretching of the laminate is performed using a dry stretching method or a wet stretching method.

5. The method of claim 1, wherein the stretching of the laminate is performed in an aqueous boric acid solution having a boric acid content of 1 wt % to 5 wt %.

6. The method of claim 1, wherein after the stretching of the laminate, an adhesive force between the stretched polyvinyl alcohol-based film and the stretched high-density polyethylene film is 2 N/2 cm or less.

7. The method of claim 1, wherein before the stretching of the laminate, the method further comprises dyeing the non-stretched polyvinyl alcohol-based film with one or more of iodine and a dichroic dye.

8. The method of claim 1, wherein after the stretching of the laminate, the method further comprises separating the stretched polyvinyl alcohol-based film from the stretched high-density polyethylene film.

9. The method of claim 8, wherein the separating of the stretched polyvinyl alcohol-based film from the stretched high-density polyethylene film is performed by applying a peel force of 2 N/2 cm or less.

* * * * *